United States Patent
Stükerjürgen

(10) Patent No.: US 9,784,400 B2
(45) Date of Patent: Oct. 10, 2017

(54) METHOD AND DEVICE FOR PRODUCING NON-ROUND WOUND TUBES FROM PLASTIC PROFILES

(71) Applicant: FERDINAND STÜKERJÜRGEN GMBH & CO. KG, Rietberg (DE)

(72) Inventor: Frank Stükerjürgen, Rietberg (DE)

(73) Assignee: FERDINAND STÜKERJÜRGEN GMBH & CO. KG, Rietberg (DE)

( * ) Notice: Subject to any disclaimer, the term of this patent is extended or adjusted under 35 U.S.C. 154(b) by 248 days.

(21) Appl. No.: 14/426,605

(22) PCT Filed: Jan. 29, 2013

(86) PCT No.: PCT/EP2013/051673
§ 371 (c)(1),
(2) Date: Mar. 6, 2015

(87) PCT Pub. No.: WO2014/044411
PCT Pub. Date: Mar. 27, 2014

(65) Prior Publication Data
US 2015/0219265 A1    Aug. 6, 2015

(30) Foreign Application Priority Data
Sep. 21, 2012   (DE) .................. 10 2012 108 948

(51) Int. Cl.
*B29C 73/00*    (2006.01)
*B32B 43/00*    (2006.01)
(Continued)

(52) U.S. Cl.
CPC ............ *F16L 55/165* (2013.01); *B29C 63/32* (2013.01); *F16L 55/1655* (2013.01); *F16L 55/18* (2013.01);
(Continued)

(58) Field of Classification Search
CPC ........ F16L 55/1655; F16L 55/18; F16L 11/16; F16L 11/24; B29C 53/78; B29C 63/32;
(Continued)

(56) References Cited

U.S. PATENT DOCUMENTS 3,972,200 A * 8/1976 Scarpi ...................... E21D 9/04
405/141
5,171,105 A * 12/1992 Grotenhofer ............. E03F 3/06
405/141
(Continued)

FOREIGN PATENT DOCUMENTS

AU   WO 8911060 A1 * 11/1989 .......... F16L 55/1655
AU   WO 9834742 A1 *  8/1998 ........... B29C 53/584
(Continued)

OTHER PUBLICATIONS

International Search Report (dated May 7, 2013) for corresponding International App. PCT/EP2013/051673.

*Primary Examiner* — Philip Tucker
*Assistant Examiner* — Brian R Slawski
(74) *Attorney, Agent, or Firm* — WRB-IP LLP

(57) ABSTRACT

A method and a device for repairing portions of channels, including non-round channels, is provided by a wound tube wound from a profile strip by a winding machine, the abutting edges of which strip are formed into tight joints, locked inside the wound tube which can be introduced into the portion of the channel to be repaired. A plastic profile strip is drawn from a storage spool and fed to a winding machine arranged in front of one of the openings of the channel to be repaired, the winding machine having a guide rail adapted to the cross-portion of the channel, and adjacent edge regions fed onto this rotating winding former locked in an overlapping manner to form a wound pipe and the pipe is pushed or pulled into the channel portion.

4 Claims, 7 Drawing Sheets

(51) Int. Cl.
| | |
|---|---|
| B29C 70/34 | (2006.01) |
| B65H 81/00 | (2006.01) |
| B29C 53/78 | (2006.01) |
| B31F 1/00 | (2006.01) |
| B29C 65/00 | (2006.01) |
| B32B 37/00 | (2006.01) |
| B65C 9/26 | (2006.01) |
| D04H 3/04 | (2012.01) |
| F16L 55/16 | (2006.01) |
| B29C 53/00 | (2006.01) |
| B29C 55/00 | (2006.01) |
| B31C 1/00 | (2006.01) |
| F16L 55/18 | (2006.01) |
| F16L 55/165 | (2006.01) |
| B29C 63/32 | (2006.01) |
| B29C 65/48 | (2006.01) |
| E03F 3/06 | (2006.01) |

(52) U.S. Cl.
CPC .............. *B29C 53/78* (2013.01); *B29C 65/48* (2013.01); *B29C 66/4329* (2013.01); *E03F 2003/065* (2013.01)

(58) Field of Classification Search
CPC . B29C 65/48; B29C 66/4329; B29C 66/5221; E03F 2003/065
USPC ....... 156/60, 71, 74, 94, 143, 144, 160, 162, 156/165, 184, 185, 187, 189, 191, 194, 156/195, 196, 199, 200, 201, 203, 212, 156/213, 215, 217, 218, 293, 294, 349, 156/391, 392, 425, 426, 499, 538, 539, 156/543, 547; 138/97, 98; 493/299; 264/281; 405/150.1, 184.1, 184.2; 72/49, 50
See application file for complete search history.

(56) References Cited

U.S. PATENT DOCUMENTS

2009/0129869 A1* 5/2009 Zivanovic ........... F16L 55/1655
                                                                                        405/184.2
2010/0243093 A1* 9/2010 Wilson ................. F16L 55/163
                                                                                        138/98

FOREIGN PATENT DOCUMENTS

| DE | WO 9005873 A1 * | 5/1990 | .......... F16L 55/1655 |
|---|---|---|---|
| EP | 0902224 A1 | 3/1999 | |
| EP | 2172327 A1 | 4/2010 | |
| JP | 62103127 A * | 5/1987 | |
| JP | WO 9509725 A1 * | 4/1995 | ............ B29C 53/78 |
| JP | 2006035596 A * | 2/2006 | |
| JP | 2010264622 A | 11/2010 | |
| WO | 9834742 A1 | 8/1998 | |
| WO | 2006108216 A | 10/2006 | |
| WO | 2012108434 A1 | 8/2012 | |

* cited by examiner

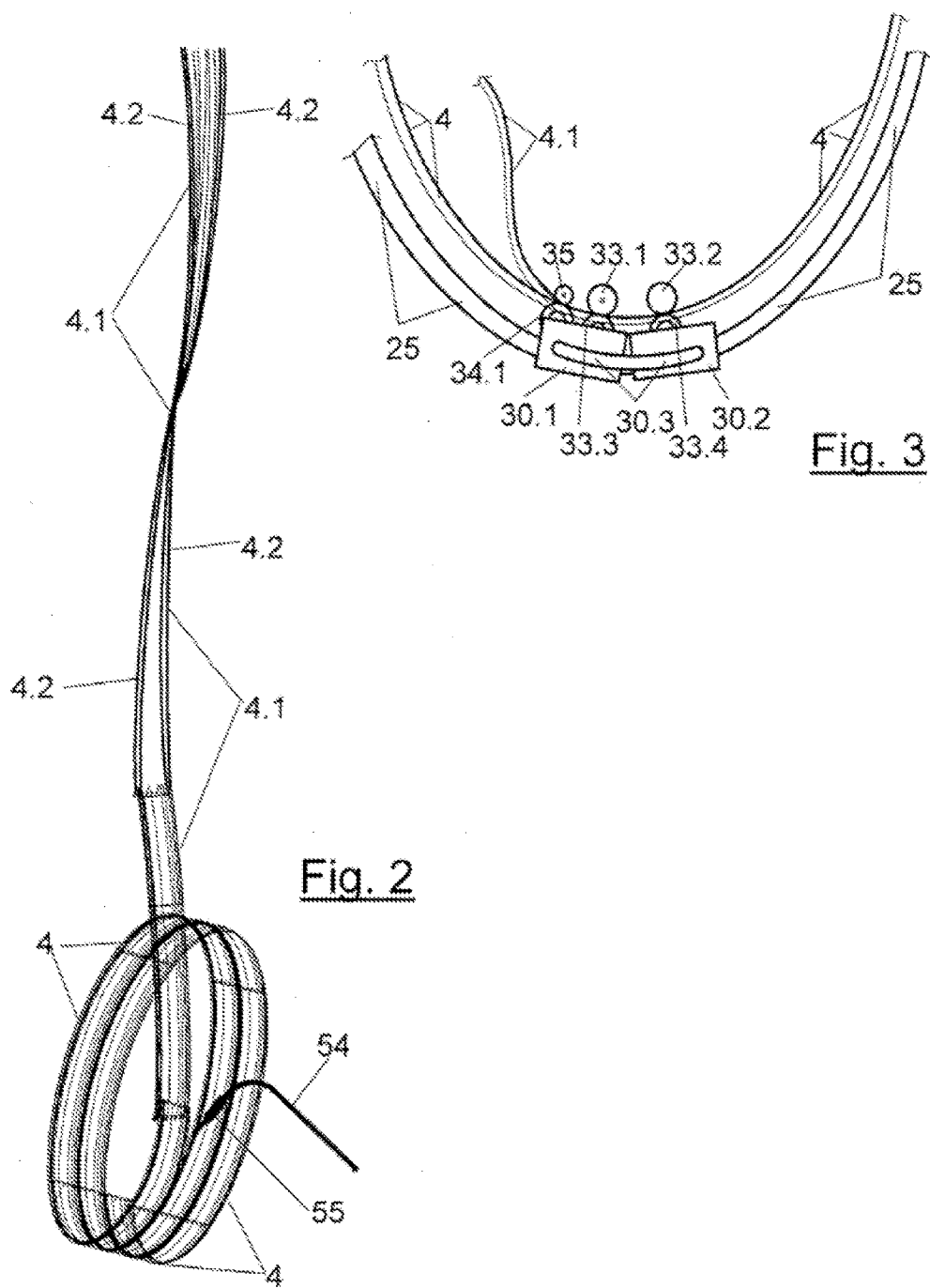

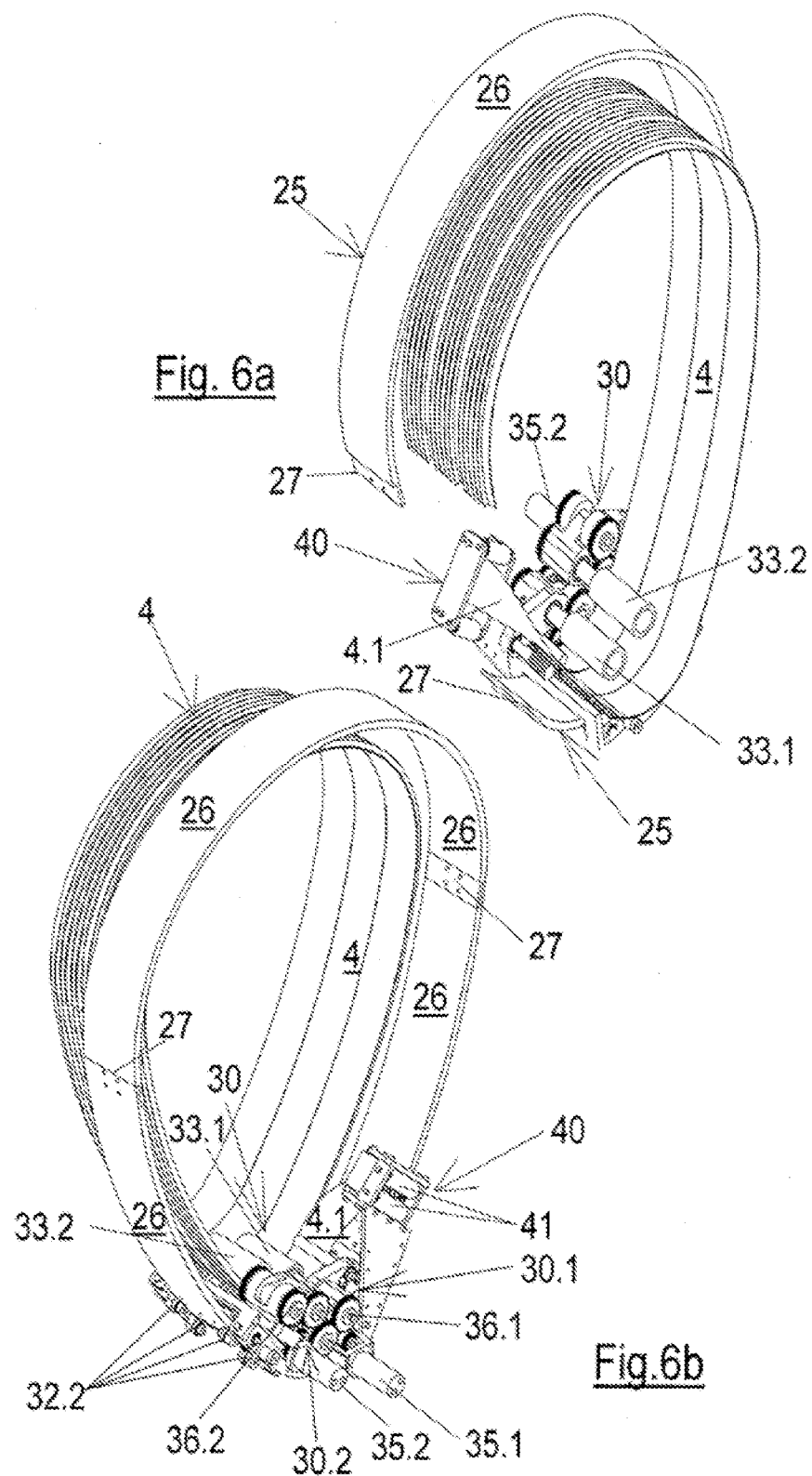

METHOD AND DEVICE FOR PRODUCING NON-ROUND WOUND TUBES FROM PLASTIC PROFILES

BACKGROUND AND SUMMARY

The invention relates to a method for repairing section of non-round wastewater channels between two revision shafts with wound tubes wound from profile strips in which the abutting edges of successive tube windings of the wound profile strips consisting of or comprising plastic and locked to tight connections form the wound tube that can be introduced into the wastewater channel to be repaired; furthermore, it also relates to a device for carrying out this method.

During the removal of wastewater, as a rule wastewater channels are used that are composed of concrete tubes. These concrete tubes are subject to corrosion by the wastewater so that from to time repairs become necessary. For this, it is known that wound tubes wound from extruded plastic profiles are used, among other things. For the repair channel section between two revision shafts are selected in which such a wound tube is introduced until the end of the section of the wastewater channel to be repaired has been reached. In order to form the wound tube the profile strip supplied through the revision shaft is put into tube windings and the abutting edges of successive tube windings of adjacent profile strips are locked to tight connections. A manufacturing device for this is disclosed by DE 696 36 214 T2 and EP 2 085 209 A1. In these disclosed instances the profile strip of plastic is supplied to a winding former that is permanently arranged in the area of the mouth of the wastewater channel to be repaired and in which the profile strip is placed in tube windings and the edge areas of adjacent tube windings are locked in an overlapping manner. In such a manufacture tube windings on tube windings are joined together in this manner to the wound tube and inserted in a rotating manner into the channel piece. Therefore, the use of such methods is limited to the repair of wastewater channels with a round cross section. When used in the area of a non-round channels, then significant cross-sectional areas would have to remain unused.

A further development of the above is found in EP 2 085 209 A1 in which the adaptation to deviating diameters as well as to deviating shapes is achieved by a chain-like pressure member in which at least two of the chain members are provided standing inward as compensation means. The profile strip supplied from the outside through the repaired channel section is joined here to windings and the abutting edge areas of successive tube windings are locked to a tight connection overlapping each other. The winding machine moves in accordance with the progress of the manufacturing through the channel to be repaired so that the wound tube is manufactured on site. This procedure seems problematic on account of the winding machine moving through the channel section to be repaired on the one hand on account of the contaminants deposited on the wall of the wastewater channel and on the other hand since in the case of problems with the winding machine the repair has to be made on site in the channel to be repaired. Since instead of round concrete tubes primarily non-round concrete tubes—for example, egg-shaped or mouth-shaped profiles—are frequently used, especially in the case of channel cross sections of wastewater channels that are not too large when damage to be repaired occurs, a repair by the known means is not possible or only insufficiently possible.

It is desirable to provide a method for repairing even non-round concrete channels with such plastic profile strips and of indicating a device appropriate for this in which the disadvantages of the prior art are avoided.

In order to carry out the previously described method the wound tube is formed from tube windings of a profile strip that are joined together by a winding machine rotating on a guide track in such a manner that adjacent edge areas are brought together and locked. To this end a winding machine is installed on a revision chamber on the bottom of a first revision shaft which machine has a guide track adapted to the cross-sectional shape of the channel to be repaired and comprises a winding former rotating on it and which is installed in front of the mouth of the channel section to be repaired. To this end supports can be provided directed against the walls of the revision chamber or its top and bottom. If these supports are mounted on tracks, this makes possible a shifting that corresponds to the progress of the manufacture. In this case the drawing in of the finished wound tube section takes place discontinuously in pieces corresponding to the possibility of shifting. A certain movability of the winding device can also be achieved by suspending the guide track for example, on chains.

A winding former is arranged on the inside of the guide track that laterally encompasses the guide track with C profiles and is held on it by rollers that reach under it and rest on the outside of the guide track in such a manner that it can rotate along the guide track. In order to achieve a smooth rotation the guide track is advantageously composed of several individual pieces that are joined to one another in a smooth manner so that the winding former can smoothly rotate on the guide track independently of its shape and can draw the profile strip in during its rotation.

In such a procedure the profile strip is drawn off a storage roll in such a manner that the torsion conditioned by the rotation of the winding former is canceled out. In order to manufacture the wound tube on site this profile strip is supplied to the winding former by the first revision shaft and joined together in the winding former to tube windings whose shape corresponds to the shape of the guide track. The edge areas of adjacent tube windings are locked to each other in an overlapping manner. Since the winding former follows the guide track in its movement, each of the formed tube windings corresponds to the shape of the guide track and therefore also to the cross-sectional shape of the channel section to be repaired. The wound tube is lengthened at each revolution of the winding formed by the width of the profile strip minus the overlap width. Therefore, with a wound tube manufactured in this manner and consisting of or comprising joined tube windings locked to each other in their overlapping edge areas even those can be repaired whose cross section is non-round, for example, wastewater channels with an egg-shaped or mouth-shaped profile in addition to channel sections with a round cross section since the wound tube manufactured in this manner is introduced into the channel section to be repaired without rotation by pushing in or, especially in the case of long channels or ones deviating from a linearity, also be being drawn in, and therefore even their channel repair is made possible.

In order to improve the locking connection the edge areas connected to each other are adhered at least in the area of the grooves located in each other with sealing mass or adhesive. The shape of the wound tube given by the guide track is advantageously additionally ensured by a steel wire insert. In this manner a liquid-tight and especially stable wound tube is obtained.

The winding former comprises a strip inlet through which the profile strip is supplied. A profile roll ensures that the grooves of the edge area of the last-finished windings of the wound tube come to rest on the adjacent edge area of the supplied profile strip, the profiles of both profile strips are locked by the friction rollers pressing against the profile strips and are brought into the shape set by the guide track. In order to bring about the revolution of the winding former on the guide track, the winding former is provided with at least one drive. The electrically or hydraulically driven motors act to this end via friction rollers or drive rollers on the profile strip that ran in and was formed to a winding as well as on the adjacent profile strip and therefore bring about the advance of the winding former as well as the tightening of the profile strip. In order to achieve a sufficient transfer force, the pressure rollers cooperate with profile counter-rollers. The top of the base body of the winding former facing the windings is preferably also profiled. The outwardly directed profiling of the conjoined profile strips is pressed into these profiles and locked.

In order to be able to travel through the possibly narrow curves of the guide track in non-round cross sections the winding former is advantageously constructed in several parts. The part facing the band inlet is formed as a pre-former and the part facing the band outlet is formed as an end finisher. Especially in the case of large dimensions it can be advantageous if other intermediate parts are inserted between the pre-former and the end finisher of the winding former. Furthermore, it is advantageous for the movability of the winding former if the individual parts of the winding former are pivotably articulated to a rocker arm. At least the pre-former as well as the end finisher advantageously comprises its own drive, wherein each of the drives cooperates with the guide track via friction rollers.

At each revolution of the winding former on the guide track a new tube winding is placed from the profile strip on the already present tube windings so that each revolution results in a lengthening of the manufactured wound tube by one strip width. The drives can also act here on a profile roller and/or pressure roller at the strip entrance that bring together the edge area of the incoming profile strip onto the edge areas to be overlapped of the edge area of the previous winding that already ran in and was formed to a winding.

In order to drive the winding former, electromotors or hydraulic motors are provided whose energy supply takes place preferably close to the center of the guide track. For a smooth rotation of the winding former on the guide track, rotary connections for the electrical lines or hydraulic lines are provided by which even their torsion conditioned by the rotation is counteracted. In order to not hinder a free running in of the profile strip into the winding former, it is advantageous if the energy supplied takes place through the channel section to be repaired. Since the electrical lines or hydraulic lines run to the stationarily positioned winding machines here, they are also stationary. The drive motors act via friction rollers on the guide track and therefore bring about the movement of the winding former. In order to achieve full revolutions of the winding former especially in the case of a narrow curves or in the case of large diameters, it can be advantageous to provide an auxiliary drive on the winding former. The latter is provided as a non-positive or frictionally connected drive on the winding former that acts directly on the guide track. To this end the guide track is advantageously provided with a corrugation or a cogging that, cooperating with the drive gear of the auxiliary drive, ensures the non-positive connection necessary for the desired movement. This auxiliary drive is advantageously articulated to the rocker arm connecting the pre-former and the end finisher and can therefore also pivot opposite them.

The profile strip used for the repair is taken off from a storage roll at the mouth of the (first) revision shaft in such a manner that that the rotation of the profile strip produced upon each rotation of the winding former is canceled. To this end the profile strip is drawn off from the standing drum held in its position similar to an air hose, wherein each of the drawn-off drum windings compensates a torsional winding conditioned by the rotation of the winding former. The direction of winding of the profile strip on the storage drum is directed against the torsion caused by the rotation of the winding former. Alternatively, the drum is appropriately rotated, wherein the direction of rotation is directed against the torsion of the profile strip caused by the rotation of the winding former. To this end the drum is placed on a rotary plate above the shaft mouth (wherein the position is set for safety reasons at a level that makes possible an escape out of the revision shaft in case of danger). Alternatively, the drum is moved around the shaft mouth, wherein the direction of rotation is directed against torsion of the profile strip caused by the rotation of the winding former.

The finished wound tube can be introduced free of rotation into the channel section with a round or non-round shape to be repaired by the winding former rotating of the guide track. To this end the finished wound tube is pushed into the latter or—in particular in the case of rather long sections of the channel to be repaired—drawn in. The latter counteracts the danger of a buckling of the wound tube so that it is preferred even in the case of misplacement or bends. It is understood that pushing in and drawing in can also be combined.

It can be necessary in special instances to move the winding machine away from the mouth of the channel section to be repaired according to the manufacturing progress. To this end it is set up on a baseplate arranged on the bottom of the revision chamber and supported by at least one support against the cover and/or walls, wherein the baseplate is arranged so that it can move on a bottom track and the support/supports are arranged so that they can move on cover tracks with ends constructed as sliding shoes. A baseplate drive is provided for the return at least for the movement of the baseplate with a winding machine.

In order to secure the locked overlappings of adjacent profile strips an adhesive or a seal is provided. This supply of an adhesive or of a sealing mass (designated only as "adhesive" without limitation in the following) takes place together with the energy supply via the extension arm directed to the center of the guide track. An adhesive storage with a pump for compensating the torsion caused by the rotating winding former is arranged on the upper plate of the rotary plate of the stand of the storage roll of the profile strip. The adhesive line is run together with the drawn-off profile strip through the first revision shaft to the winding machine. Alternatively, the adhesive supply is provided through the second revision shaft, wherein the adhesive line runs together with the hydraulic lines through the second revision shaft to the winding machine and is connected to the winding machine by a rotary connection.

In order to introduce the adhesive between the edge areas of the last manufactured tube winding of the wound tube to be joined together and of the supplied profile strip, an adhesive supply with adhesive nozzle connected to the rotary connection runs in such a manner between these edge areas that exiting adhesive passes into the locking area and is applied and distributed there under the action of the profile roller and the pressure roller. For this application the adhesive nozzle is brought—on account of the rotation of the winding former—in a brushing manner onto the groove receiving the adhesive. A special stability is achieved if the profile strip used consisting of or comprising a thermoplastic elastomer is extruded while supplying a jet charge.

The introduction of the manufactured wound tube into the channel section to be repaired takes place primarily by advance, wherein the wound tube grows by a length upon each rotation of the winding former corresponding to the width of the profile strip minus the width of the overlap. In order to avoid buckling in rather long channel sections to be repaired, a traction device is provided that attacks the free end of the finished wound tube. The finished wound tube is drawn in quasi-continuously into the channel section to be repaired in accordance with the progress of the manufacturing. To this end a traction device is provided that is either arranged in the next-following revision shaft, wherein the traction table is run through the channel section to be repaired, or which is provided above ground in the vicinity of the shaft mouth of the second revision shaft, whereby the traction cable is run through the second revision shaft and the channel section to be repaired.

This traction device is either controlled by the manufacturing and draws the wound tube in accordance with the progress of the manufacturing in a continuously following manner into the channel section. Alternatively, a discontinuous drawing in is provided in which the winding machine is preferably set up in its revision chamber and moves in accordance with the progress of the manufacturing away from the channel mouth until a given length of the wound tube with the width of the revision chamber has been manufactured. This length is then drawn into the section of the channel piece to be repaired by the traction device that acts on the manufactured wound tube.

BRIEF DESCRIPTION OF THE DRAWINGS

An exemplary embodiment of the invention is shown in the drawings in a purely schematic manner and is described in detail in the following. In the drawings

FIG. 2 shows a detail of the profile strip supplying—the bringing together of profile strip and wound tube with the supply of adhesive;

FIG. 3 shows the winding former with strip supply and connections.

FIG. 6a shows a detail of a guide track with winding former with a wound tube starting from the supply side of the profile strip;

FIG. 6b shows a detail of a guide track with winding former with a wound tube from the outlet side of the wound tube;

DETAILED DESCRIPTION

Figure 1:
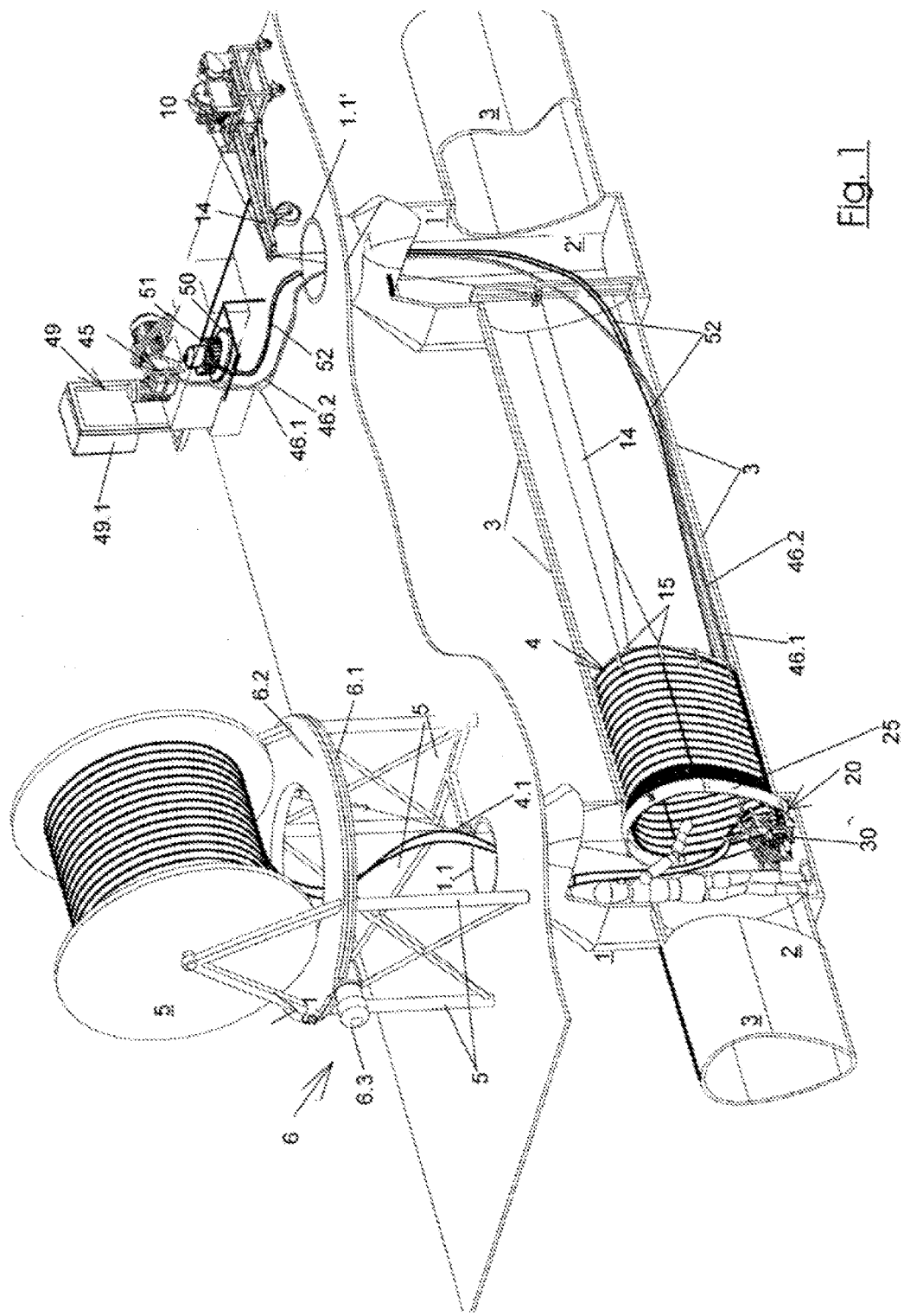
FIG. 1 shows an overview of a channel repair (only the first revision shaft)

The FIGS. 1, 2 and 3 schematically show the repair of a channel section 3. It takes place starting from a first revision shaft 1 to a second revision shaft 1' section by section with the aid of a wound tube 4 produced by the winding machine 20 (described in detail further below) from a profile strip 4.1. The profile strip 4.1 is drawn off from a band supply on a storage drum 5 that is set up above ground during the repair of underground channel tubes (3). The profile strip 4.1 is supplied to the winding machine 20 through the revision shaft 1. The latter is set up on site in the revision chamber 2 arranged on the bottom of the first revision shaft 1 at the beginning of the channel 3 to be repaired and comprises a guide track 25 on which the winding former 30 is arranged in such a manner that it can freely rotate on the guide track 25.

Since the profile strip 4.1 is twisted upon each revolution of the winding former 30—as FIG. 2 shows—its drawing off from the storage drum 5 with the storage drum 5 being stationary is similar to that of an air hose. Alternatively, the storage drum 5 held by a drum holder 5.1 is set up on a rotary plate with a bottom plate 6.1 and an upper plate 6.2 over the shaft mouth 1.1 on a stand 7 in such a manner that the torsion of the profile strip 4.1 produced by the rotation of the winding former 30 is canceled out by the rotation of the storage drum 5 obtained when it is being drawn off. The rotation of the upper plate 6.2 can be supported here by a motor drive 6.3.

Figure 5A:
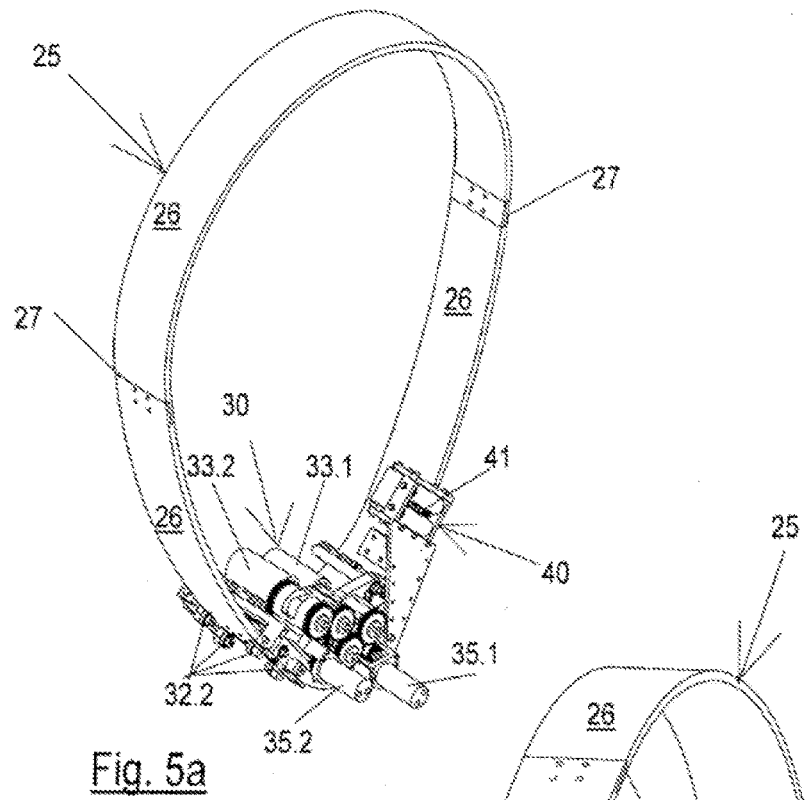
FIG. 5a shows a detail of a guide track with winding former from the supply side of the profile strip.
Figure 5B:
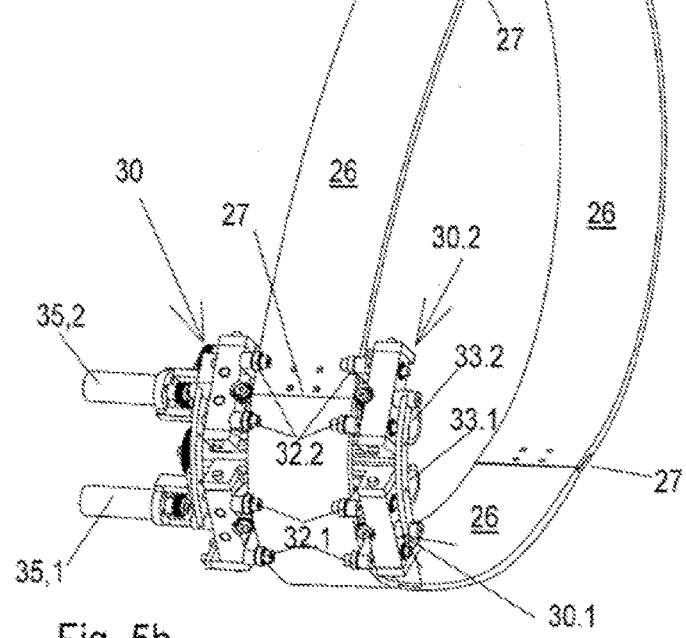
FIG. 5b shows a detail of a guide track with winding former from the outlet side of the profile strip.
Figure 7A:
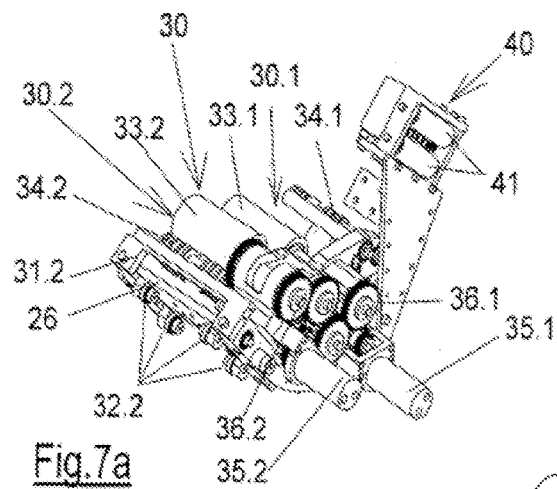
FIG. 7a shows a detail of a winding former from the supply side of the profile strip; (perspective top view)
Figure 7B:
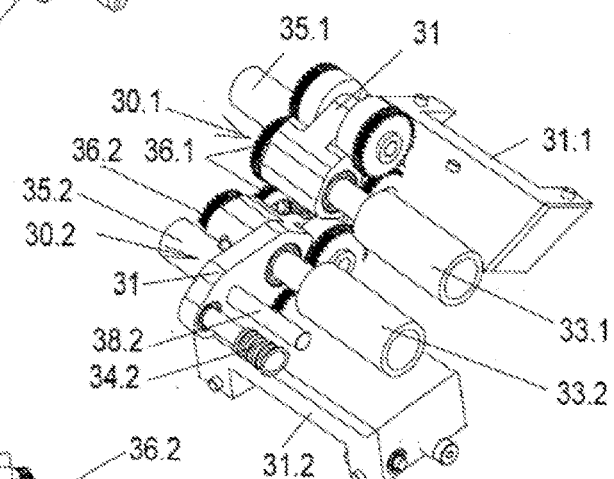
FIG. 7b shows a detail of the winding former (perspective top view)
Figure 7C:
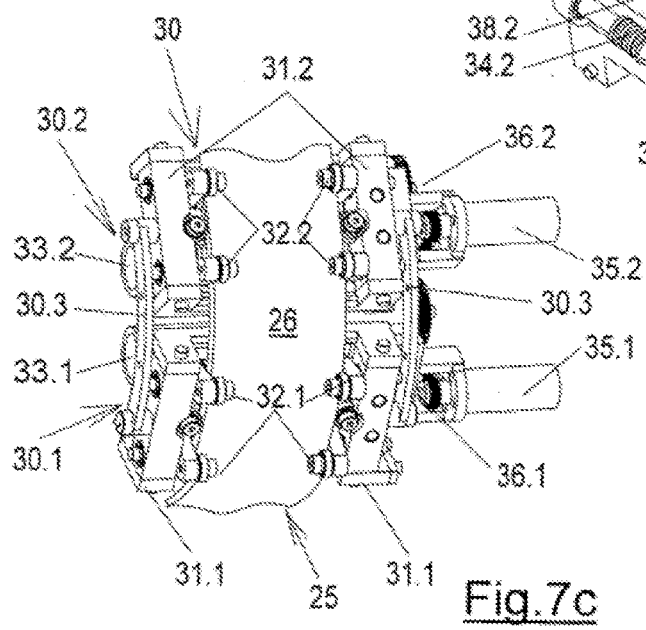
FIG. 7c shows a detail of the winding former (perspective bottom view)

FIG. 3 shows in a simplified manner the bringing together of the profile strip 4.1 in the schematically shown winding former 30 with the last one of the windings of the already wound wound tube 4. This profile strip 4.1 is guided from the storage drum 5 through the first revision shaft 1 (FIG. 1) to the winding machine 20 and introduced into the winding former 20. The profile strip 4.1 runs into the winding former 20 here in such a manner that that its smooth surface 4.2 facing the inner wall of the wound tube 4 forms the latter, wherein the side 4.3 of the profile strip 4.1 provided in the profiles is directed outward with the lateral catch strips 4.4. The winding former 30 runs around the guide track 25, which leads to the torsions of the profile strip 4.1 (not shown in detail). The profile strip 4.1 supplied from the strip guidance 40 (FIG. 5) to the winding former 30 is received by the profile roller 34.1 in such a manner that its edge area 4.4, facing the last winding of the finished wound tube 4, and the round the area of the profile strip binding this last winding lie superposed over one another and engage in one another by the counter-pressure of the pressure roller 32.3. The final locking then takes place under the contact pressure of the drive rollers 33.1 and 32.2 of the pre-former 30.1 and final finisher 30.2 by the counter-pressure of the pressure rollers 34.1 and 34.1 so that the winding, which is therefore newly formed, is firmly connected to the previous winding. The adhesive removed from the adhesive storage 50 by the adhesive pump 51 (both in FIG. 1) via the adhesive supply 54 (only in FIG. 7) is introduced between the edge area 4.4 of the profile strip 4.1 and the edge area of the profile strip forming the last winding of the wound tube 4, that are to be joined to one another, which adhesive then ensures an appropriate distribution for a reliable and tight connection of the edge areas to be joined to one another.

As an alternative embodiment according to FIG. 2b, a movable positioning of the winding machine 20 in the revision chamber 2 advantageously brings about a discontinuous drawing in of the finished section of the wound tube 4 by the traction device 10'. To this end the winding machine 20 stands on a base plate 21 set up on bottom tracks 22. Furthermore, cover tracks 24 are provided for the supports 23 directed toward the cover of the revision chamber 2 and/or its walls on which cover tracks the free ends, designed as sliding shoes 23.1, of the supports 23 are guided. The winding machine 20 set up in this manner can be removed in the revision chamber 2 from the mouth of the channel 3 to be repaired as a function of the progress of the manufacture. The finished wound tube 4 is drawn in discontinuously here, wherein the maximal length corresponds to the width of the revision chamber 2.

Figure 4A:
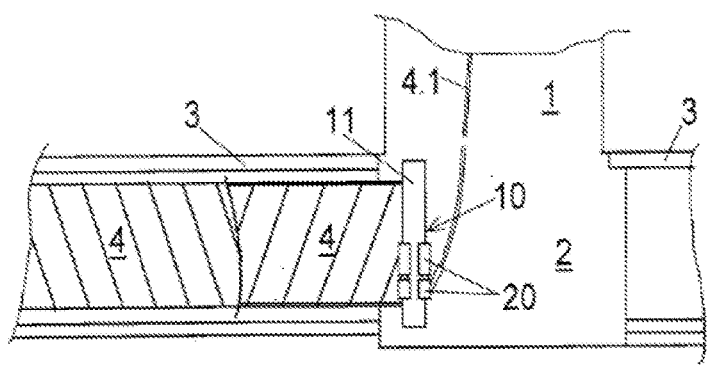
FIG. 4a shows a view of the winding machine arranged on the bottom of the revision shaft with guide track (1st possibility of arrangement)
Figure 4B:
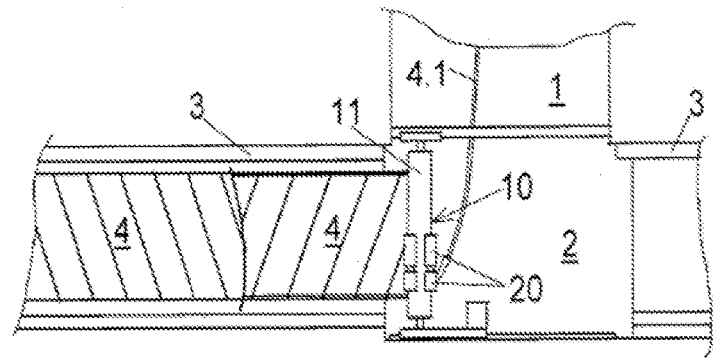
FIG. 4b shows a view of the winding machine arranged on the bottom of the revision shaft with guide track (2nd possibility of arrangement)

The FIGS. 4a and 4b show the winding machine in the bottom of the first revision shaft. The wound tube 4 finished in this manner is pushed into the channel 3 to be repaired in accordance with the progress of the manufacture. In order to counteract a buckling, conditioned by the progress of the manufacture, of the wound tube 4 in the case of long or uneven channels, the winding machine 20 has a certain movability that—as shown in FIG. 4a—can be achieved in the simplest case by suspension 24.1, for example, on a cross track 24. Alternately, the winding machine 20 is supported by supports 23 against the bottom, the cover and/or the walls of the revision chamber 2. Furthermore, it is advantageous if the winding machine 20 stands on a base plate 21.

A movable positioning of the winding machine 20 in the revision chamber 2 shown in FIG. 4b is advantageous for a discontinuous drawing in of the finished section of the wound tube 4 by the traction device 10. To this end the winding machine 20 stands on a base plate 21 positioned on bottom tracks 22. Furthermore, cover tracks 24 are provided for the supports 23 directed toward the cover of the revision chamber 2 and/or its walls on which cover tracks the free ends of the supports 23, that are constructed as sliding shoes 23.1 are guided. The winding machine 20 set up in this manner can be removed in the revision chamber 2 from the mouth of the channel 3 to be repaired in accordance with the progress of the manufacture. The finished wound tube 4 is drawn in discontinuously, whereby the maximal length corresponds to the width of the revision chamber 2.

Figure 4C:
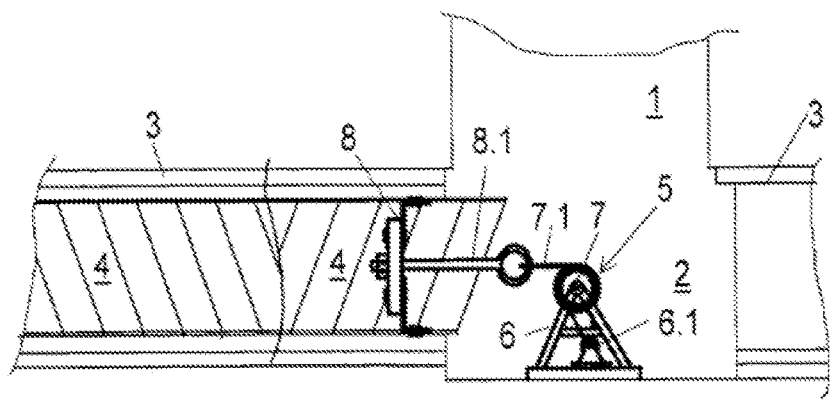
FIG. 4c shows a view of a traction device arranged in the bottom of the following revision shaft.

FIG. 4c shows in an advantageous manner a cooperation of the winding machine 20 with a traction device 10 that acts on the end of the finished wound tube 4 via a winch 11 arranged on a frame 12, provided with a drive motor 13 and with a collectible traction cable 14. This traction device 10 can be placed either in the revision chamber 2' of the second revision shaft 1', which chamber is located at the end of the section of the channel 3 to be repaired or, as an alternative the traction cable 14 is conducted by the above-ground traction device 10—as FIG. 1 shows—through the shaft mouth 1.1' of the second revision shaft 1' to the traction assembly 15 and into the latter to which the traction cable 14 is attached for drawing the finished wound tube 4 forward. The winch 11 is advantageously controlled in such a manner that the finished wound tube 4 is drawn into the channel 3 to be repaired in accordance with the progress of the manufacture.

FIGS. 5 to 8 show the winding machine 20 with winding former 30 and details of the winding former 30. In order to produce non-round wound tubes 4, the winding former 30 with supply 40 for the profile strip 4.1 to be processed rotates on the guide trace 25 adapted to the cross-sectional shape of the channel to be repaired. In order that the guide track 25 can be readily adapted to the desired shape and the winding former 30 can rotate on it without hindrance, the guide track 25 is advantageously joined together from several partial pieces 26 that merge smoothly into each other at the joints 27. The winding former 30 is guided with the C profiles 31.1 and 31.2 laterally surrounding the guide track 25 on the guide track 25 and held by the counter-holding rollers 32.1 and 32.2 extending behind the guide track 25. This construction conditions a reliable seat of the winding machine 30 on the guide track 25 and its ability to move freely on it.

In order to make it possible for the guide track 25 to rotate freely even in narrow curvatures, the winding former 30 is advantageously composed of several parts—in the drawings two parts are shown, the one as a pre-former 30.1 and the other as an end finisher 30.2—that are articulated on both sides to rocker arms 30.3. In order to show the winding former 30 on the guide track 25, C-shaped guide shoes 31.1 and 31.2 are provided on the base body 31 which are provided with counter-holding rollers 32.1 and 32.2 extending behind the guide rail 25 for bringing about this hold.

The wound tube 4 produced in this manner—as the FIG. 4 show—is pushed into or drawn into the channel section 3 to be repaired. In order to counteract a buckling of the wound tube 4 conditioned by the progress of the manufacture in the case of long or uneven channels, the winding machine 20 has a certain movability that can be achieved in the simplest case by suspension 24.1, for example, on a holder in the area of the shaft mouth 1.1 of the first revision shaft 1 or on a cover track 24 arranged in the revision chamber 2. Alternatively, the winding machine 20 is supported by supports 23 against the bottom, the cover and/or the walls of the revision chamber 2. Furthermore, it is advantageous if the winding machine 20 stands on a base plate 21, in particular if the latter can be moved on the track 22.

The supplied profile strip 4.1 is taken by a strip inlet 40 arranged on the pre-former 30.1 and placed in the performer 30.1 and in tube windings during its movement along the guide track 25 that follow each other in such a manner that the edge areas of two successive tube windings overlap. The bringing together of the profile strip 4.1 with the wound tube 4 can be schematically recognized in FIG. 7. The profiling of the profile strip 4.1 as well as of the wound tube 4 is represented by the parallel line (that is sketched in weaker). The bringing together takes place between the profile roller 34.1 and the pressure roller 36.1 and the locking of the edge profiles of the last of the finished tube winding of the wound tube 4 with the supplied profile strip 4.1, which edge profiles engage with each other during the bringing together, takes place between the friction rollers for the drive 33.1 and 33.2 and between counter-rollers 33.3 and 33.4 cooperating with the latter and appropriately profiled (only FIG. 8—due to the representation of FIG. 5a only the profile roller 34.2 cooperating with the pressure roller 32.2 can be recognized).

The edge areas of the profile strips 4.1, which areas are provided with profiles corresponding to each other, are placed in each other during the joining together and are locked in a known manner to the wound tube 4. Therefore, the length of the wound tube 4 increases upon each rotation of the winding former 30 on the guide track 25 by the width of the profile strip 4.1 reduced by one overlapping width.

The top of the base body 31 facing the profile strip 4.1 is advantageously profiled by pre-former 30.1 and end finisher 30.2—as well as also between both other inserted partial pieces of the winding former 30—in accordance with the profile of the profile strip 4.1. The outwardly directed profile of the profile strip 4.1 formed to the wound tube 4 and joined together, is pressed into the profiling under the pressure of the pressure rollers 32.1 and 32.1—not shown in detail in the figures—and therefore locked. Furthermore, as a result of this profiling the transfer of force from the pressure rollers 32.1 and 32.2 onto the smooth inside of the profile strip 4.1 formed to the wound tube 4 and joined together is improved and therefore the advance of the winding former 30 is also improved.

The manufacture of the wound tube 4 from the supplied profile strip 4.1 takes place by the winding former 30 rotating on the guide track 25 of the winding machine 20. The latter is constructed in a multipartite manner in order to achieve a good mobility for the rotation especially in the case of narrowly bent guide tracks. Its part facing the supply 40 for the profile strip 4.1 to be processed is constructed as pre-former 30.1 and its following part is constructed as an end finisher 30.2 that are connected by a rocker arm 32 to which these two parts are pivotably articulated. The parts can be inserted between these two parts as intermediate parts, which is particularly advantageous in the case of large dimensions of the wound tube to be manufactured.

For rotating on the guide track 25 winding former 30 arranged on it is equipped with its own drive. In the case of winding former 30 constructed in several parts each of these parts 30.1, 30.2 advantageously has its own drive motor 36.1, 36.2 that brings about the progression of the winding former 30 on the guide track 25 by acting on the friction rollers 33.1, 33.2 of these parts. The friction rollers 33.1, 33.2 cooperate with the last-placed tube winding of the finished wound tube 4 and with the supplied profile strip 4.1. It is understood that even other drives can be provided instead of the friction rollers.

The two parts 30.1, 30.2 of the winding former 30 comprise C profiles 31.1 for the pre-former 30.1 and 31.2 for the end finisher 30.2 which profiles laterally receive the profile of the guide track 25, wherein corresponding counter-holding rollers 32.1 and 32.2 are arranged on them and extend behind the received edge area of the guide tracks 25 and therefore ensure a reliable seating of the pre-former 30.1 as well as of the end finisher 30.2 of the winding former 30 on the guide track 25. The friction rollers 33.1 and 33.2 act on the profile strip 4.1 to be formed to the wound tube 4 and therefore bring about a drawing in of the profile strip 4.1 and its placing into tube windings in addition to the rotation on the guide track 25, wherein adjacent edge areas are joined to each other in an overlapping manner. The drives 36.1 and 36.2 act via back-gear transmissions 36.1 and 36.2 on the friction- or drive rollers 33.1 and 33.2 of each of the parts 30.1 and 30.2 and also on their profile rollers 34.1 and 34.2 that bring about the locking of the edge areas of adjacent tube windings of profile strips, the shape of which profile rollers corresponds at least to the profile of the edge areas of the profile strip 4.1 used for the manufacture and therefore ensure an adaptation of the driving speed of each of the drives 36.1, 36.2 relative to the speeds required for the advance of the winding former 30 via the friction- or drive rollers 33.1, 33.2 and for that of the profile rollers 34.1 and 34.2.

In order to achieve an adhering or sealing in the area of the overlapping of two adjacent profile strips, adhesive or sealing mass is supplied. To this end a third line is provided in FIG. 1 as adhesive line 52 in addition to the lines for the hydraulic advance 46.1 and the hydraulic return 46.2 via which line 52 the adhesive that can be taken from an adhesive store 50 by a pump 51—shown in the representation as an immersion pump—and is supplied to the winding former 30 via the adhesive line 52. This line is run together with the lines 46.1, 46.2 through the second revision shaft 1' with the revision chamber 2' into the section of the channel 3 that has not yet been repaired or only partially repaired, which section ends at the winding former 30, wherein the friction rollers for the lines can be provided as required in the revision chamber 2'. Appropriate hydraulic rotary connections 47 are provided on the winding former 30 for the compensation of torsions conditioned by its rotation for the hydraulic lines 46.1, 46.2 and a rotary adhesive connection 53 is provided for the adhesive line 52 that are advantageously provided on an extension arm 40.1 directed toward the center of the guide track 25.

From the hydraulic rotary connections the hydraulic advance and the hydraulic returns run to a hydraulic distributor 47. The lines for the hydraulic advance and hydraulic return run to the corresponding motors from the outputs 47.1 of the hydraulic distributor for the drive 36.1 of the pre-former 30.1, 47.2 for the drive 36.2 of the end finisher 30.1 and—if—provided 47.3 for the auxiliary drive 43 that supports the drives 36.1 and 36.2 of the winding former 30 and acts directly on the guide track 25 (not shown in detail). The adhesive line 52 runs from its rotary connection 53 via an adhesive supply line 54 that empties into an adhesive nozzle 55. This nozzle is located between the edge areas of the last tube winding of the already finished wound tube 4 that are to be locked to each other and between the following tube winding of the supplied profile strip 4.1 and therefore allows the adhesive to pass into this overlapping area and between two or more ribs of the locking area of the profile bands. In order to reliably apply the adhesive also in the upside-down position conditioned by the rotation of the winding former 30 on the guide track 25, the nozzle mouth of the adhesive nozzle lies in a brushing manner on the groove receiving the exiting adhesive between the ribs of the particular edge area, preferably of the supplied profile strip. In this manner the adhering can be achieved in the forming of a wound tube by a winding machine 20 with a rotating winding former 30, wherein it is also understood that the adhesive store 50 is also provided on the upper plate 6.2 carrying the storage drum 5 for the supply of profile strips 4.1, wherein the adhesive line 52 is supplied together with the drawn-off profile strip 4.1 to the winding machine 20. In this arrangement no additional rotary connection for the adhesive line is needed on account of the arrangement on the rotary plate 6.2 rotating in accordance with the drawing-off of the strips.

Figure 8:
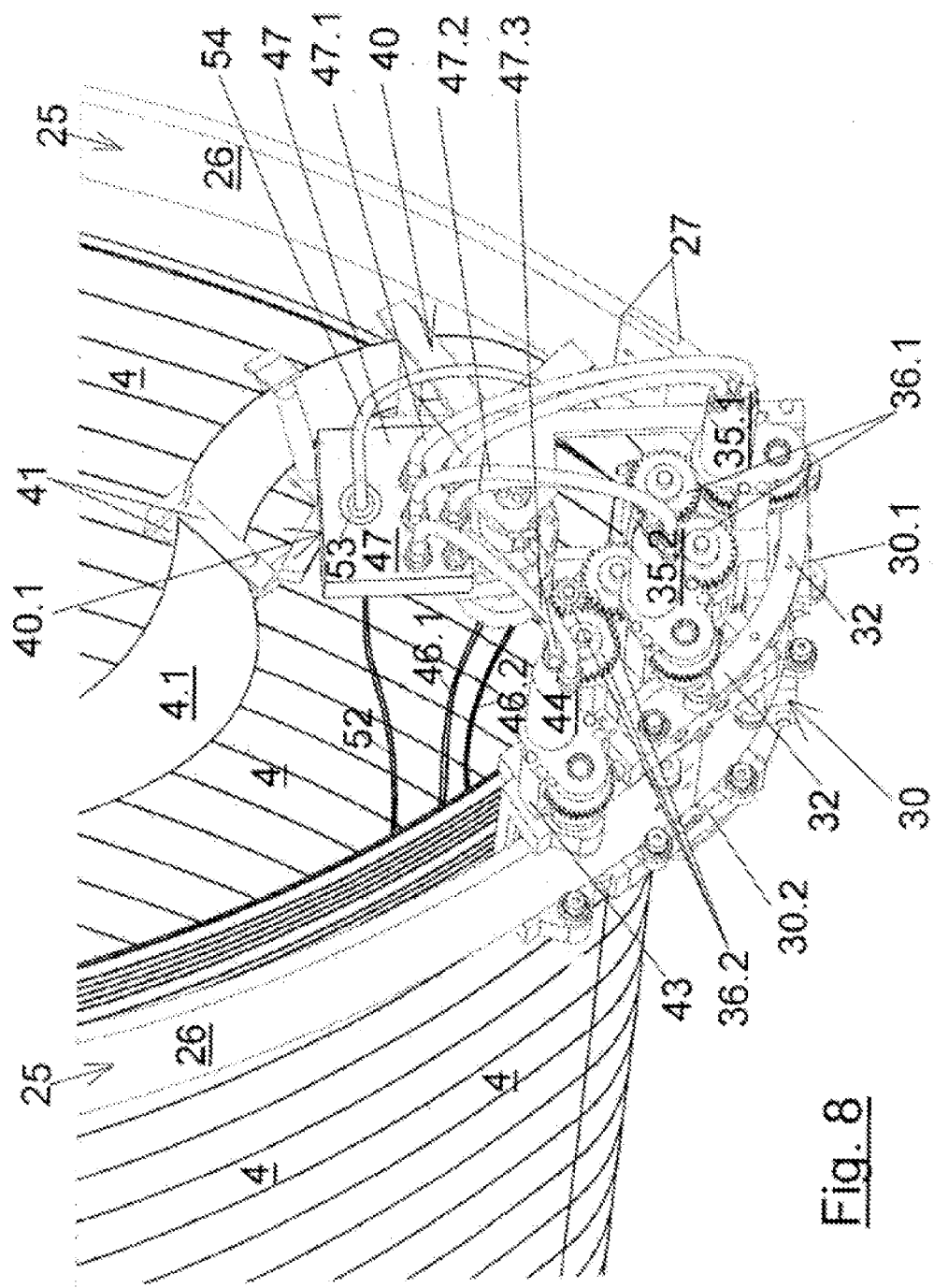
FIG. 8 shows a detail of the winding former with auxiliary drive and connections.

FIG. 8 shows the connection of the supply lines to the winding former 30. The hydraulic drives 36.1 and 36.2 are supplied with energy via the hydraulic lines for the supply line 46.1 and for the removal line 46.2 connected to the hydraulic generator 45. The infeed takes place via rotary connections 47.1 and 47.2 with which the torsion of the lines 46.1, 46.2 caused by the rotation of the winding former 30 as well as the adhesive line 52 is compensated. The outputs (not shown in detail) run to a hydraulic distributor 48 that distributes the hydraulic fluid via the connections 48.1 and 48.2 for the advance flow and the return flow onto the individual hydraulic motors 36.1 and 36.2 driving the friction rollers 33.1, 33.2. The third connection 48.3 supplies the auxiliary drive 43 (FIG. 6). The adhesive line 52 coming from the adhesive pump 51 is conducted via the rotary connection 53 to the winding former 30. The output of the rotary connection 53 runs via the adhesive supply line 54 to the joining together of already finished wound tube 4 and to the profile strip 4.1 and empties in an adhesive nozzle 55 arranged between these two in the overlapping range.

A control stand 49 with a hydraulic device 45 (FIG. 1) supplies the energy for the drives constructed as hydraulic motors; a switch box 49.1 allows the controlling and monitoring of the system. The hydraulic device 45 also comprises an adhesive supply 50 with pump 51—represented as an immersion pump—to whose output the adhesive line 52 is connected via which the adhesive is supplied to the winding former 30. The hydraulic hoses 46.1, 46.2 and also the adhesive line 52 are connected to the winding former 30 of the stationarily erected winding machine 20 and therefore also remain stationary in the channel. Wound tube 4 extends over them in accordance with the progress of the manufacturing.

LIST OF REFERENCE NUMERALS 01 first revision shaft
01.1 shaft mouth
01' second revision shaft
01.1' shaft mouth
02 first revision chamber
02' second revision chamber
03 channel tube, channel section
04 wound tube
04.1 profile strip
05 storage drum
05.1 drum holder
06 rotary plate
06.1 lower plate
06.2 upper plate
06.3 motor drive
07 stand
08
09
10 traction device
11 winch
12 frame
13 drive motor
14 traction cable
15 traction assembly
16
17
18
19
20 winding machine
21 base plate of the winding machine
21.1 return drive
22 bottom track
23 support
23.1 sliding shoe
24 cover track
24.1 suspension of the winding machine
25 guide track
26 partial piece off the guide track
27 joint (between two partial pieces joined together)
28:
29:
30 winding former
30.1 pre-former
30.2 end finisher
32 rocker arms
31 base body
31.1 C-shaped guide shoe
31.2 C-shaped guide shoe
31.1 laterally surrounding C-profile
31.2 laterally surrounding C-profile
32.1 pressure roller
32.2 pressure roller
32.3 counter-holding roller
32.4 counter-holding roller
33.1 friction roller for the drive
33.2 friction roller for the drive
34.1 profile roller
34.2 profile roller
35 pressure roller
36.1 hydraulic motor
36.2 hydraulic motor
37.1 back-gear transmission
37.2 back-gear transmission
38
39
40 strip supply
41 strip inlet
42 strip outlet
43 auxiliary drive
44
45 hydraulic device hydraulic generator
46.1 hydraulic lines—advance line
46.2 hydraulic lines—return line
47 hydraulic distributor
47.1 first connection (with hydraulic advance and return)
47.2 second connection (with hydraulic advance and return)
47.3 third connection (with hydraulic advance and return)
48:
49 control stand
49.1 switch box
50 adhesive storage
51 pump, adhesive pump
52 adhesive line
53 rotary connections for adhesive line
52 lines for adhesive 52, adhesive line
53 rotary connection
54 adhesive supply
55 adhesive nozzle

The invention claimed is:

1. A method for repairing sections of non-round channels between first and second revision shafts, comprising
arranging a winding machine in a revision chamber at the bottom of the first revision shaft,
introducing into a channel to be repaired tube windings wound by the winding machine from profile strips to form a wound tube by locking abutting edges of successive tube windings of the wound profile strip, comprising
drawing profile strips off from a storage roll,
supplying profile strips drawn off from the storage roll to a guide track having a cross-sectional shape corresponding to a shape of the channel to be repaired,
supplying profile strips drawn off from the storage roll to a winding former rotating on the guide track to form successive tube windings,
canceling torsion in the profile strips caused by rotating of the winding former on the guide track,
locking abutting edges of the successive tube windings in an overlapping manner to form the wound tube, and
pushing or drawing the wound tube into the channel to be repaired.

2. The method according to claim 1, wherein the torsion in the profile strips is canceled by rotating the storage roll about an axis at a right angle to an axis of the storage roll.

3. The method according to claim 1, wherein the finished wound tube is continuously pushed in or drawn into the channel to be repaired.

4. The method according to claim 1, wherein an adhesive is introduced into at least one joint at the locked abutting edges.

* * * * *